United States Patent [19]

Johna et al.

[11] Patent Number: 4,825,444
[45] Date of Patent: Apr. 25, 1989

[54] LASER EMISSION MATERIAL

[75] Inventors: Nobuo Johna, Funabashi; Tsutomu Ishikawa; Takeshi Kawabe, both of Tokyo; Masayoshi Nakamura, Chiba, all of Japan

[73] Assignee: Lion Corporation, Tokyo, Japan

[21] Appl. No.: 247,240

[22] Filed: Sep. 21, 1988

[30] Foreign Application Priority Data

Sep. 25, 1987 [JP] Japan .................................. 62-241584
Jul. 11, 1988 [JP] Japan .................................. 63-173176

[51] Int. Cl.$^4$ ................................................. H01S 3/16
[52] U.S. Cl. ....................................................... 372/41
[58] Field of Search ...................................... 372/41, 40; 252/301.4 P

[56] References Cited

U.S. PATENT DOCUMENTS 4,371,965  2/1983  Lempicki et al. ...................... 372/40

Primary Examiner—Léon Scott, Jr.
Attorney, Agent, or Firm—Armstrong, Nikaido, Marmelstein, Kubovcik & Murray

[57] ABSTRACT

A laser emission material containing a solid laser active medium dispersed in a melt molded product matrix of a zeolite.

2 Claims, 2 Drawing Sheets

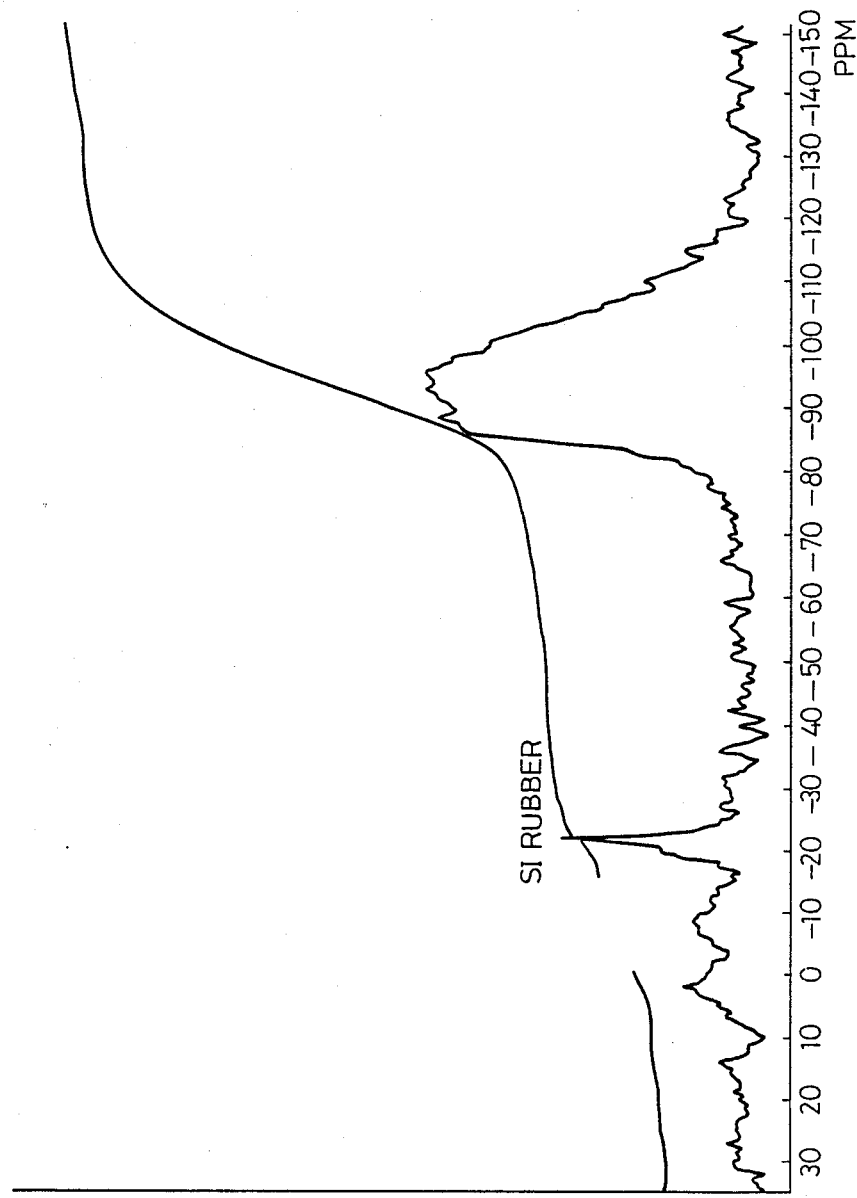

LASER EMISSION MATERIAL

BACKGROUND OF THE INVENTION

1. Field of the Invention

The present invention relates to a laser active material. More specifically, it relates to a laser active material capable of possessing an active lasing medium substance at a high concentration, with very little concentration quenching, and having a long fluorescent service life.

2. Description of the Related Art

In solid lasers, a transition metal or rare earth atoms are generally used as an active lasing medium and single crystals or glass materials as a matrix. The active medium materials are contained in a small amount as impurities in the matrix to form the emission materials. Various laser active materials formed by combining different kinds of ion and matrices have been proposed.

Glass lasers composed of $Nd^{3+}$ ion solubilized into glass matrices are commercially available, and these glass lasers are advantageous, compared to those utilizing single crystals as a matrix, in that various shapes can be readily formed, large size materials can be readily obtained, and especially in the case of phosphate glasses, relatively a large amount of active media can be doped so that a large power and large energy can be appropriately and instantaneously generated. Nevertheless, many problems remain in connection with these glass lasers.

Silicate glass lasers have an excellent mechanical strength and thermal shock resistance, but also have an unpreferably large concentration quenching. Namely, although a high discharge power can be obtained when a large amount of an Nd ion is included, concentration quenching occurs to shorten the fluorescent life time due to the addition of a large amount of an Nd ion. Thus, in practice, a large amount of $Nd_2O_3$ cannot be dopped.

Phosphate glasses can contain a larger amount of $Nd_2O_3$, compared to silicate glasses, but the concentration quenching is still large and thus in practice a large amount of $Nd_2O_3$ cannot be included therein. Further, when a large amount of $P_2O_5$ is included in the laser emission materials, the water-vapor resistance and thermal shock resistance are remarkably decreased, and this is also a very serious problems in the art.

SUMMARY OF THE INVENTION

Accordingly, the objects of the present invention are to solve the above-mentioned problems of the prior art and to provide a laser emission material capable of possessing an active lasing medium substance at a high concentration, with very little concentration quenching, and having a long fluorescent service life and a high thermal shock resistance.

Other objects and advantages of the present invention will be apparent from the following description.

In accordance with the present invention, there is provided a laser emission material comprising a solid active lasing medium dispersed in a matrix, wherein a melt molded product of a zeolite is used as the matrix.

BRIEF DESCRIPTION OF THE DRAWING

The present invention will be better understood from the description set forth below with reference to the accompanying drawings, in which.

DESCRIPTION OF THE PREFERRED EMBODIMENTS

Figure 1:
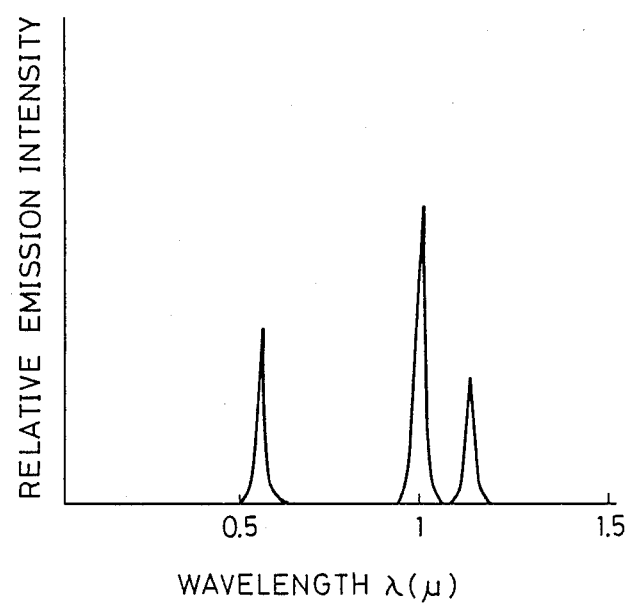
FIG. 1 illustrates a fluorescent spectrum of the laser emission obtained in Example 1; and, FIG. 2 is a chart illustrating a $^{23}Si(MAS)NMR$ spectrum of the laser glass obtained in Example 2.

According to the present invention, the zeolites used preferably have the following formula (I), as the anhydride:

$$k\text{Me}_{\frac{2}{l}}\text{O}.\text{Al}_2\text{O}_3.m\text{SiO}_2.n\text{P}_2\text{O}_5 \qquad (I)$$

wherein Me is an alkali metal or an alkaline earth metal, k is 0.01 to 10, l is an atomic valence of Me, m is 1.5 to 150, and n is 0 to 10.

The Me in the formula (I) is a cation in the zeolite crystal and is selected from alkali metals and alkaline earth metals. When a portion or all of these metals is substituted with a metal constituting the active lasing medium, prior to the melt molding of the zeolite, the active lasing medium ion can be uniformly dispersed in the zeolite. Namely, glass molded products obtained from the starting zeolite ion exchanged with a metal ion, i.e., the active lasing medium, can be preferably used as a solid laser emission material. Accordingly, the Me in the formula (I) must be a metal such that it can be ion-exchanged with a metal constituting the active lasing substance, and further, does not prevent the light emission of the active lasing medium. Typical examples of such metals are sodium, potassium, lithium, calcium, and magnesium.

In the above-mentioned general formula (I), phosphorus-containing zeolites are represented especially when n is not zero. Phosphorus-containing zeolites, having various crystalline forms, such as type-A, type-B, type-O, type-R, and type-W, also have an ion-exchanging capability, similar to zeolites not containing phosphorus. These zeolites are known as P-A type, P-B type, P-O type, P-R type, and P-W type zeolites, and are useful as the matrix material. The preferable number of n in the general formula (I) is 0 to 10. When n is larger than 10, the mechanical strength of the zeolite may be unpreferably decreased due to an increase in the phosphorus content.

Furthermore, the crystalline zeolites wherein m=1.5-20 in the general formula (I) are preferable as the zeolite used in the present invention, and especially preferable, are type-A, type-X, type-Y, type-P-A, type P-B, type P-R, and type P-W zeolites.

As the active lasing media, rare earth ions such as $Eu^{3+}$, $Er^{3+}$, $Ho^3$, $Nd^{3+}$, $Pr^{3+}$, $Sm^{3+}$, $Tm^{3+}$, $Yb^{3+}$, $Dy^{2+}$, and $Tm^{2+}$ are especially preferable.

The "concentration quenching" phenomenon occurring in laser active materials is caused by an interaction of the adjacent active lasing medium due to an increase in the concentration thereof, and thus the active lasing medium should be maintained under a condition such that each atom of the active lasing medium is independently present in the matrix at a predetermined distance to ensure that the interaction does not occur. Nevertheless, when the starting powder is conventionally melted to produce the desired laser active material, it is difficult to ensure that the powder particles of the active lasing medium are uniformly dispersed at an atomic level, and therefore, aggregates are formed during the melting to cause concentration quenching.

Contrary to the above, according to the present invention, the active lasing medium can be advantageously uniformly dispersed in a matrix at an atomic level by ion-exchanging the cation in the zeolite with a metal constituting the active lasing medium, to thereby incorporate the active lasing medium at an atomic level into the zeolite, followed by melt molding the zeolite substituted with the active lasing medium, and thus the desired laser emission materials can be obtained.

Further, an atmosphere formed by the ambient atoms, especially a magnetic environment, is important, in addition to the interaction of the active lasing medium, to the emission of the active lasing medium. For example, a large amount of the active lasing medium, i.e., $Nd^{3+}$ ion, can be included in a phosphate glass, compared to a silicate glass, because the structure of the phosphate glass has a unique magnetic environment.

The present inventors found that the fluorescent life of an active lasing medium is remarkably increased when the active lasing medium is present in a special magnetic environment resulting from the interaction of the atoms with each other in the matrix composed of the melt molded product of the above-mentioned zeolite. Although this magnetic environment cannot be directly determined from the active lasing medium, the magnetic environment can be represented by measuring the magnetic environment of the Si atoms present in the ambient system, by 29Si Magic Rotation Angle Nuclear Magnetic Resonance, i.e., "29Si(MAS)NMR", which is a solid high resolving power nuclear magnetic resonance.

Namely, a portion of the melt molded product of the above-mentioned zeolite containing the active lasing medium uniformly dispersed therein is cut and reduced to a powder in a mortar. The 29Si(MAS)NMR of the resultant powder is measured at room temperature to obtain a spectrum and a ratio of (a) an integrated area intensity I of the peaks within the chemical shift range of $-80$ ppm to $-105$ ppm, on the basis of tetramethylsilane (i.e., "TMS") to (b) an integrated area intensity Io of the total peaks is determined as a spectrum intensity ratio. It has been found that, when this spectrum intensity ratio is within 20% to 80%, the laser emission element has an excellent fluorescent life.

Although the reason therefor is not clearly understood, when the peak is more than $-80$ ppm, the magnetic environment is too strong, and therefore, the fluorescent life time appears to be decreased by the effects of the interaction with the fluorescence to be emitted. Conversely, when the peak is less than $-105$ ppm, the magnetic environment is too weak and therefore, the active lasing medium may be formed into aggregates by a thermal energy when melting, and thus an unpreferable concentration quenching will occur due to an interaction of the active lasing medium.

Furthermore, when the spectrum intensity ratio is less than 20%, a ratio of the active lasing medium in the unpreferable magnetic environment becomes large and the fluorescent life is decreased. The spectrum intensity ratio can be adjusted by, for example, melting the zeolite ion-exchanged with an active lasing medium, followed by cooling, while controlling the melting time and the cooling rate.

According to the present invention, the zeolite powder is previously chemically adsorbed with a metal ion, which is capable of becoming an active lasing medium, by utilizing the ion-exchange power or chemical adsorption power of the zeolite, and the zeolite powder substituted with the metal ion is then melted, followed by molding into the desired shape after cooling. Accordingly, the active lasing medium ion can be easily included, uniformly and in a large amount, in the matrix.

The above-mentioned chemical adsorption (or ion exchange) can be conducted by bringing a metal ion capable of becoming the active lasing medium into contact with the zeolite. More specifically, a water-soluble salt of the metal constituting the active lasing medium is added to water, and while stirring, the zeolite powder or slurry is added thereto. The stirring is continued until the desired substitution rate is obtained. When the substitution rate of the metal ion is to be increased, the temperature of the zeolite dispersion is increased.

Next, the resultant reaction mixture is subjected to a solid-liquid separation by, for example, suction filtration or centrifugal separation, followed by repeatedly washing with water until substantially no ion is detected in the separated liquid, and thereafter, the cake is dried to obtain the desired zeolite powder substituted with the metal ion.

The powder obtained above is melted at a temperature of 1400° C. to 2000° C., followed by thoroughly deaerating and dewatering by a conventional method, for example, stirring or bubbling with a dry gas, and thereafter, the molten zeolite substituted with the metal ion is molded to the desired shape and thus, the laser emission material is produced. If desired, $Cd^{2+}$, $Cu^{2+}$, $Mn^{2+}$, $UO_2^{2+}$, $Ce^{3+}$, $Cr^{3+}$, $Y^{3+}$, and the like can be added as a sensitizing agent.

As explained above, according to the present invention, when the active lasing medium is included at a high concentration, the concentration quenching is minimized by using the melt molded product of the zeolite as a matrix, and thus, a laser active material having a long fluorescent life time can be provided. Furthermore, since the laser emission product according to the present invention has a large mechanical strength and a small thermal expansion coefficient, the thermal shock resistance is high.

Furthermore, the fluorescent life time can be further improved by using a zeolite having the specified composition ratio and by adjusting the magnetic environment of the molten zeolite matrix within the specified range.

Accordingly, laser active materials having a higher discharge power and a longer service life time can be obtained and the present laser active materials can be advantageously used as a high power laser active element.

EXAMPLES

The present invention will now be further illustrated by, but is by no means limited to, the following Examples, wherein all parts and percentages are expressed on a weight basis unless otherwise noted. The evaluation methods used in the following Examples are as follows.

(1) Method of Determining Spectrum Intensity Ratio of $^{29}Si(MAS)NMR$

A small amount of a melt molded product of zeolite containing a laser emission medium dispersed therein is cut, followed by a reduction to a powder in a mortar, to prepare a sample for the $^{29}Si(MAS)NMR$ determination.

The $^{29}Si(MAS)NMR$ of this sample is determined under the following conditions.
Device: JNM-GX270 manufactured by JAPAN ELECTRON CO., LTD.
Temperature: Room temperature
Standard Substance: Si rubber (TMS basis-21.92 ppm)
Measured Nuclear: $^{29}Si$
Resonance Frequency: 53.67 kHz
Pulse Width: 1.3 μsec (30°)
Pulse Repeating Time:
    ACQTM=0.148 sec
    PD=7.0 sec
Data Point:
    POINT 8192
    SAMPO 8000
Spectrum Width: 27027 Hz
Integrated Times: More than 5000 times
Pulse Mode: MASGHD
Contact Time: 7.0 msec The quantitative determination is carried out, based upon the resultant spectrum chart (see FIG. 2), as follows.

The sum I of the integrated area intensity of the peaks having a chemical shift within $-80$ ppm to $-105$ ppm in terms of the TMS standard is determined, and the sum $I_0$ of the integrated area intensity of all the peaks is separately determined. The spectrum intensity ratio R is obtained from the ratio of these values, (i.e., $I/I_0$).

When one broad peak is shown, as in FIG. 2, the spectrum intensity ratio can be determined by calculating the ratio of the integrated area intensity within $-80$ ppm to $-105$ ppm to the entire area intensity, from the following equation.

$$R(\%) = \frac{I}{I_0} \times 100$$

(2) Method of Determining Fluorescent Service Life

A cubic sample having a size of approximately $10 \times 10 \times 10$ mm is finished by pitchpolishing and then used for determining the fluorescent service life. The fluorescent service life $\tau$ is determined as follows.

A xenon flush lamp having a pulse width of approximately 1 μsec is used, as a light source, in combination with an aqueous copper sulfate solution and a glass filter, to excite all of the samples at a wavelength of about 3650 Å. The emission from the sample is received by a 316 (spectral sensitivity characteristic, S-1) photomultiplier positioned behind an interference filter having a maximum transmittance at 1.06 μ, and the output is introduced into a synchroscope and the emission waveform appearing on the Braun tube photographed and then analyzed. The $\tau$ value is represented as a time at which the initial emission intensity is attenuated to $1/e$.

(3) Method of Determining Coefficient of Thermal Expansion

A sample supported by a supporting rod is placed, in the center of a quartz tube in an electric furnace. The change $\Delta l$ in the length of a sample is determined when the sample is heated at a constant heating rate of 50° C. to 300° C. under the following determination conditions.

Determination Conditions
Temperature Elevation Rate: 2° C./min
Atmosphere: Open air
Temperature: 50° to 300° C.
Load: 30 g
Sensitivity: 200 μm The ratio of $\Delta l$ to the sample length $l_0$ at a temperature of 25° C. is determined, and the coefficient $\sigma$ of the thermal expansion is calculated from the following equation.

Coefficient of Thermal Expansion $\sigma$ (1/°C.) =

$$\frac{\Delta l}{l_0} \cdot \frac{1}{300°\ C. - 50°\ C.}$$

EXAMPLE 1

A 330 g amount of neodymium nitrate $Nd(NO_3)_3$ was dissolved in 2000 g of water and 365 g of crystalline alumino silicate (type-NaA, $SiO_2/Al_2O_3=2$, dry matter 77.8%) was added thereto, followed by stirring at a temperature of 60° C. for 12 hours.

Thereafter, a solid-liquid separation was carried out by suction filtration and the resultant cake was thoroughly washed with water until the nitrate ion could not be detected in the filtrate, and the cake was then dried at a temperature of 800° C. for 2 hours. Accordingly, the aluminosilicate powder exchanged with the neodymium ion was obtained.

The powder obtained above was melted at a temperature of 1600° C., followed by quenching to obtain a glass for laser. An analysis showed that, neodymium was contained at a content of 28% by weight in the glass. Furthermore, almost all of the neodymium present in the glass was in the original form of $Nd^{3+}$.

The coefficient of thermal expansion and the fluorescent life time of the laser glass are shown in Table 1, and the emission spectrum is shown in FIG. 1.

COMPARATIVE EXAMPLE 1

A powder mixture having a composition of 37.3 mol % of $P_2O_5$, 20 mol % of $SiO_2$, 10 mol % of $K_2O$, and 32.7 mol % of $Nd_2O_3$ was thoroughly mixed and the mixture was melted at a temperature of 1600° C, followed by quenching, to obtain a uniform glass.

The coefficient of thermal expansion and the fluorescent life time of the resultant glass are shown in Table 1.

TABLE 1

| | Example 1 | Comparative Example 1 |
|---|---|---|
| $Nd^{3+}$ (wt %) | 28 | 28 |
| Fluorescent Life Time (μsec) | 190 | 20 |
| Coefficient of Thermal Expansion ($10^{-5}$/°C.) | 3.8 | 8.7 |

EXAMPLE 2

A 194.6 g amount of neodymium nitrate $Nd(NO_3)\cdot 6H_2O$ having a purity of 99.9% was dissolved in 2000 g of water and 365 g of crystalline zeolite ($Na_2O\cdot Al_2O_3\cdot 2SiO_2$, dry matter 77.8%, water content 22.2%) was added thereto, followed by stirring at a temperature of 80° C. for 5 hours.

Thereafter, a solid-liquid separation was carried out by suction filtration and the resultant cake was washed with 3 liters of pure water, followed by drying at a temperature of 105° C.

Accordingly, an aluminosilicate powder exchanged with the neodymium ion was obtained.

The powder obtained above was melted at a temperature of 1600° C. in a platinum crucible, followed by quenching at a cooling rate of 30° C./min, to obtain a glass. A fluorescent X-ray quantitative analysis showed that neodymium was contained at a content of 20% by weight in the glass.

The spectrum intensity ratio and the fluorescent life time of the resultant laser glass as determined by a $^{29}Si(MAS)NMR$ method are shown in Table 2.

COMPARATIVE EXAMPLE 2

A 120 g amount of silica powder (purity 99.9%, Kanto Kagaku K.K.), 102 g of alumina powder (purity 99.9%, Showa Keikinzoku K.K.), 21.08 g of $Na_2O$ (purity 99.9%, Kanto Kagaku K.K., and 73.92 g of neodymium oxide $Nd_2O_3$ (purity 99.9% Kanto Kagaku K.K.) were placed in a platinum crucible, followed by melting at a temperature of 1600° C. The molten mixture was thoroughly stirred with a platinum rod, followed by quenching at a cooling rate of 30° C./min to obtain the laser glass.

An analysis showed that neodymium was contained at a content of 20% by weight in the glass.

The spectrum intensity ratio and the fluorescent life time of the laser glass are shown in Table 2.

EXAMPLE 3

A 123.8 g amount of erbium nitrate $Er(NO_3)_3.6H_2O$ having a purity of 99.9% was dissolved in 2000 g of pure water and 406.2 g of crystalline zeolite ($K_2O.Al_2O_3.2SiO_2$, purity 77.8%, water content 22.2%) was added thereto, followed by stirring at a temperature of 100° C. for 3 hours.

Thereafter, a solid-liquid separation was carried out by suction filtration and the resultant cake was thoroughly washed with 3 liters of pure water. The cake was then dried at a temperature of 105° C. for 2 hours, and thus the zeolite powder exchanged with the erbium ion was obtained.

The powder obtained above was melted in a platinum crucible at a temperature of 1600° C., followed by quenching at a rate of 50° C./min, to obtain a glass. A fluorescent X-ray quantitative analysis showed that erbium was contained at a content of 5% by weight in the glass. The spectrum intensity ratio and the fluorescent life time obtained by $^{29}Si(MAS)NMR$ determination are shown in Table 2.

COMPARATIVE EXAMPLE 3

A 120 g amount of the silica powder (purity 99.9% and 102 g of the alumina powder (purity 99.9%) both as used in Comparative Example 2, 56.4 g of potassium oxide (purity 99.9%, Kanto Kagaku K.K.), and 50.8 g of erbium oxide ($Er_2O_3$, purity 99.9%, Kanto Kagaku K.K.) were melted in a platinum crucible at a temperature of 1600° C., followed by thoroughly stirring with a platinum rod. The molten mixture was then quenched at a rate of 50° C./min to obtain a glass. An analysis showed that the erbium was contained at a content of 5% by weight in the glass.

The spectrum intensity ratio and the fluorescent life time are shown in Table 2.

EXAMPLE 4

A 29.2 g amount of neodymium nitrate $Nd(NO_3)_3.6H_2O$ having a purity of 99.9% and 26.1 g of ytterbium nitrate $Yb(NO_3)_3.6H_2O$ having a purity of 99.9% were dissolved in 2000 g of pure water and 406.1 g of crystalline zeolite (composition.$K_2O.Al_2O_3.2SiO_2$, dry matter 77.8%, water content 22.2%) was added thereto, followed by stirring at a temperature of 100° C. for 3 hours.

Thereafter, a laser glass was obtained in the same manner as in Example 3. An analysis showed that 3% by weight of neodymium and 3% by weight of ytterbium were contained in the glass.

The spectrum intensity ratio and the fluorescent life time obtained by $^{29}Si(MAS)NMR$ determination are shown in Table 2.

COMPARATIVE EXAMPLE 4

A 120 g amount of the silica powder (purity 99.9%) and 102 g of the alumina powder (purity 99.9%), both as used in Comparative Example 2, 76.7 g of potassium oxide (purity 99.9%, Kanto Kagaku K.K.), 11.2 g neodymium oxide (purity 99.9%, Kanto Kagaku K.K.), and 11.0 g of ytterbium oxide (purity 99.9%, Kanto Kagaku K.K.) were placed in a platinum crucible and the glass was obtained by the same procedure as in Comparative Example 3.

An analysis showed that 3% by weight of neodymium and 3% by weight of ytterbium were contained in the glass.

The spectrum intensity ratio and the fluorescent life time of the glass are shown in Table 2.

EXAMPLE 5

A 97.3 g amount of neodymium nitrate $Nd(NO_3)_3.6H_2O$ was dissolved in 2000 g of pure water and 397.0 g of crystalline phosphorus-containing zeolite type P-A powder (composition formula: $Na_2O.Al_2O_3.1.69SiO_2.0.24P_2O_5$, purity 80%, water content 20%) was added thereto, followed by stirring at a temperature of 80° C. for 5 hours.

Thereafter, a solid-liquid separation was carried out by suction filtration and the resultant cake was thoroughly washed with 3 liters of pure water. The cake was then dried at a temperature of 105° C. for 2 hours, and thus the phosphorus-containing zeolite powder exchanged with the neodymium ion was obtained. An analysis showed that neodymium was contained at a content of 10% by weight in the zeolite.

Next, 200 g of the powder obtained above was placed in a 300 ml funnel type platinum crucible and melted at a temperature of 1600° C. for 3 hours, followed by quenching to 820° C. at a cooling rate of 30° C./min. The quenched mixture was maintained at the same temperature for 10 hours, and then gradually cooled to 750° C. at a cooling rate of 0.2° C./hr and to 25° C. at a cooling rate of 5° C./min and thus a laser glass was obtained.

An analysis showed that the neodymium content in the glass was 9.9% by weight, which is substantially the same as that before melting. The composition of the glass, in terms of anhydride, was $0.67Na_2O.0.33Nd_{2/3}O.Al_2O_3.1.69SiO_2.0.24P_2O_5$.

The spectrum intensity ratio and the fluorescent life time, as determined by $^{29}Si(MAS)NMR$ measurement, are shown in Table 2.

TABLE 2

| | Active Lasing Medium | | | Method of Dispersing Active Medium | Spectrum Intensity Ratio R (%) | Fluorescent life time $\tau$ ($\mu$sec) |
|---|---|---|---|---|---|---|
| | Active ion | Content (wt. %) | Matrix | | | |
| Example 2 | $Nd^{3+}$ | 20 | $0.34Na_2O.Al_2O_3.2SiO_2$ | Ion adsorption | 75 | 180 |
| Comp. Example 2 | $Nd^{3+}$ | 20 | $0.34Na_2O + Al_2O_3 + 2SiO_2$ | Oxide powder mixing | 15 | 60 |
| Example 3 | $Er^{3+}$ | 5 | $0.60K_2O.Al_2O_3l.2SiO_2$ | Ion adsorption | 60 | 14000 |
| Comp. | $Er^{3+}$ | 5 | $0.60K_2O + Al_2O_3 + 2SiO_2$ | Oxide powder mixing | 18 | 8000 |
| Example 4 | $Nd^{3+}$ | 3 | $0.82K_2O.Al_2O_3.2SiO_2$ | Ion adsorption | 65 | 300 |
| | $Yb^{3+}$ | 3 | | | | |
| Comp. Example 4 | $Nd^{3+}$ | 3 | $0.82K_2O + Al_2O_3 + 2SiO_2$ | Oxide powder mixing | 18 | 200 |
| | $Yb^{3+}$ | 3 | | | | |
| Example 5 | $Nd^{3+}$ | 10 | $0.67Na_2O.Al_2O_3.1.69SiO_2.024P_2O_5$ | Ion adsorption | 78 | 220 |

EXAMPLE 6

A 148.9 g amount of neodymium nitrate $Nd(NO_3)_3.6H_2O$ having a purity of 99.9% (Kanto Kagaku K.K.) was dissolved in 3000 g of pure water and 708.6 g of crystalline type-Y zeolite powder (composition formula: $K_2O.Al_2O_3.5SiO_2$, dry matter 70%, water content 30%, Tosoh Corp.) was added thereto, followed by stirring at a temperature of 60° C. for 12 hours.

Thereafter, a solid-liquid separation was carried out by suction filtration and the resultant cake was thoroughly washed with 5 liters of pure water. The cake was then dried at a temperature of 105° C. for 2 hours, and thus the zeolite powder exchanged with the neodymium ion was obtained.

Next, 200 g of the powder obtained above was placed in a 300 ml funnel type platinum crucible and melted at a temperature of 1600° C. for 2 hours, followed by quenching to 850° C. at a cooling rate of 30° C./min. The mixture was then gradually cooled to 750° C. at a cooling rate of 1° C./hr and to 25° C. at a cooling rate of 3° C./min, and thus a laser glass was obtained.

An analysis showed that the neodymium content in the glass was 9.9% by weight.

The spectrum intensity ratio was 77% and the fluorescent life time was 0.32 msec, as determined by $^{29}Si(MAS)NMR$ measurement.

We claim:

1. A laser emission material comprising a solid active lasing medium dispersed in a matrix, wherein a melt molded product of a zeolite is used as the matrix.

2. A laser emission material as claimed in claim 1, wherein the zeolite has the following formula (I) as the anhydride:

$$k\mathrm{Me}_{\frac{2}{l}}O.Al_2O_3.mSiO_2.nP_2O_5 \qquad (I)$$

wherein Me is an alkali metal or an alkaline earth metal, k is 0.01 to 10, l is an atomic valence of Me, m is 1.5 to 150, and n is 0 to 10, and wherein a ratio of the sum of an integrated area intensity of peaks within the chemical shift range of −80 ppm to −105 ppm on the basis of tetramethyl silane to the sum of an integrated area intensity of the total peaks is 20 to 80% in the total peaks of the spectrum obtained by determining at room temperature 29Si magic rotation angle nuclear magnetic resonance (i.e., 29Si(MAS)NMR) of a powdered sample of the melt molded product containing the active lasing medium.

* * * * *